US 6,657,821 B1

(12) United States Patent
Jenneke (10) Patent No.: US 6,657,821 B1
(45) Date of Patent: Dec. 2, 2003

(54) HAND SUSPENSION WITH COMPLIANT LOCATING FEATURE

(75) Inventor: Richard R. Jenneke, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 176 days.

(21) Appl. No.: 09/966,687

(22) Filed: Sep. 28, 2001

(51) Int. Cl.[7] .............................................. G11B 5/596
(52) U.S. Cl. .................................................. 360/245.2
(58) Field of Search ........................... 360/245.2, 245.4

(56) References Cited

U.S. PATENT DOCUMENTS

| | | | |
|---|---|---|---|
| 5,491,597 A | 2/1996 | Bennin et al. | |
| 5,570,249 A | 10/1996 | Aoyagi et al. | |
| 5,920,444 A | 7/1999 | Heeren et al. | |
| 5,986,852 A | 11/1999 | Berg et al. | |
| 6,055,133 A | 4/2000 | Albrecht et al. | |
| 6,313,971 B1 * | 11/2001 | Takagi et al. | 360/245.2 |
| 6,466,412 B1 * | 10/2002 | Adams et al. | 360/245.2 |

OTHER PUBLICATIONS

Article: Clover–shaped STAMPING, Design News. Sep. 18, 2000; David Bak, International Editor; 2 pages.

* cited by examiner

Primary Examiner—Robert S. Tupper
(74) Attorney, Agent, or Firm—Faegre & Benson, LLP (57) ABSTRACT

A head suspension or head suspension component for supporting a head slider over a rigid disk in a dynamic storage device and a method of manufacturing. The head suspension includes a head suspension component and a compliant locating feature formed within the head suspension component. The compliant locating feature includes a plurality of spring beam tabs defined by an aperture and positioned to extend toward an opening. The compliant feature is preferably configured to receive a tapered cylindrical pin through the opening for precisely locating the head suspension component relative to a desired reference while the spring beam tabs are engaged by the tapered pin. The head suspension component may include two or more compliant locating features, and the head suspension may include two or more components that each include one or more compliant locating features.

37 Claims, 10 Drawing Sheets

HAND SUSPENSION WITH COMPLIANT LOCATING FEATURE

FIELD OF THE INVENTION

This invention relates to disk drive head suspensions having compliant features to facilitate component location during manufacture.

BACKGROUND OF THE INVENTION

In a dynamic storage device, a rotating disk is employed to store information in small magnetized domains strategically located on the disk surface. The disk is attached to and rotated by a spindle motor mounted to a frame of the disk storage device. A "head slider" (also commonly referred to simply as a "slider") having a magnetic read/write head is positioned in close proximity to the rotating disk to enable the writing and reading of data to and from the magnetic domains on the disk. The head slider is supported and properly oriented in relationship to the disk by a head suspension that provides forces and compliance necessary for proper slider operation. As the disk in the storage device rotates beneath the slider and head suspension, the air above the disk similarly rotates, thus creating an air bearing which acts with an aerodynamic design of the head slider to create a lift force on the head slider. The lift force is counteracted by the head suspension, thus positioning the slider at a height and alignment above the disk which is referred to as the "fly height."

Typical head suspensions include a load beam, a flexure, and a base plate. The load beam normally includes a mounting region at a proximal end of the load beam for mounting the head suspension to an actuator of the disk drive, a rigid region, and a spring region between the mounting region and the rigid region for providing a spring force to counteract the aerodynamic lift force acting on the slider described above. The base plate is mounted to the mounting region of the load beam to facilitate the attachment of the head suspension to the actuator. The flexure is positioned at the distal end of the load beam, and typically includes a gimbal region having a slider mounting surface to which the slider is mounted and thereby supported in read/write orientation with respect to the rotating disk. The gimbal region is resiliently moveable with respect to the remainder of the flexure in response to the aerodynamic forces generated by the air bearing.

In one type of three-piece head suspension, the flexure is formed as a separate component and further includes a load beam mounting region that is rigidly mounted at the distal end of the load beam using conventional approaches, such as spot welds. In such a flexure, the gimbal region extends distally from the load beam mounting region of the flexure and typically includes a cantilever beam to which the slider is mounted. An often spherical dimple that extends between the load beam and the slider mounting surface of the flexure is formed in either the load beam or the slider mounting surface of the flexure. The dimple transfers the spring force generated by the spring region of the load beam to the flexure and the slider to counteract the aerodynamic force generated by the air bearing between the slider and the rotating disk. In this manner, the dimple acts as a "load point" between the flexure/slider and the load beam. The load point dimple also provides clearance between the cantilever beam of the flexure and the load beam, and serves as a point about which the slider can gimbal in pitch and roll directions in response to fluctuations in the aerodynamic forces generated by the air bearing.

Electrical interconnection between the head slider a nd circuitry in the disk storage device is provided along the length of the head suspension. Conventionally, conductive wires encapsulated in insulating material or tubes are strung along the length of the head suspension between the head slider and the storage device circuitry. Alternatively, an integrated lead head suspension, such as that described in commonly assigned U.S. Pat. No. 5,491,597 to Bennin et al., that includes one or more conductive traces bonded to the load beam with a dielectric adhesive can be used to provide electrical interconnection. Such an integrated lead head suspension may include one or more bonding pads at the distal end of the traces to which the head slider is attached and that provide electrical interconnection to terminals on the head slider. The conductive trace can also be configured to provide sufficient resiliency to allow the head slider to gimbal in response to the variations in the aerodynamic forces.

As the number and density of magnetic domains on the rotating disk increase, it becomes increasingly important that the head slider be precisely aligned over the disk to ensure the proper writing and reading of data to and from the magnetic domains. Moreover, misalignments between the head slider and the disk could result in the head slider "crashing" into the disk surface as the slider gimbals due to the close proximity of the head slider to the rotating disk at the slider fly height.

The angular position of the head suspension and the head slider, also known as the static attitude, is calibrated so that when the disk drive is in operation the head slider assumes an optimal orientation at the fly height. It is therefore important that the static attitude of the head suspension be properly established. Toward this end, the flexure must be mounted to the load beam so that misalignments between the flexure and the load beam are minimized since misalignments between the load beam and flexure may introduce a bias in the static attitude of the head suspension and the head slider. It is also important that the load point dimple be properly formed on the head suspension so that it is properly positioned in relation to the head slider when the head slider is mounted to the head suspension. Misalignments between the load point dimple and the head slider may cause a torque to be exerted on the head slider, and thus affect the fly height of the head slider and the orientation of the head slider at the fly height.

To assist in the alignment of the head suspension components and in the formation of head suspension features, the head suspension typically includes reference apertures that are engaged by an alignment tool. The apertures are longitudinally spaced apart and are formed in the rigid region of the load beam. In head suspensions that include a separate flexure mounted to the load beam, the flexure includes corresponding apertures formed in the load beam mounting region of the flexure. The reference apertures in the load beam and the flexure are typically circular, and are sized and positioned so as to be substantially concentric when the flexure is mounted to the load beam. In an approach illustrated in U.S. Pat. No. 5,570,249 to Aoyagi et al., rather than being circular, a distal aperture in the load beam is elongated and generally elliptical. The aperture includes a "v" shaped portion at one end.

Rigid cylindrical pins on an alignment tool are used to align the individual head suspension components. The rigid pins are spaced apart an amount equal to the longitudinal spacing between the reference apertures in the components. The pins are inserted into and engage the apertures in the load beam and flexure, and in this manner concentrically align the apertures, and thus the load beam and the flexure, to one another. The components can then be fastened together, as by welding or other known processes.

Typical alignment tools often include four pins—two for locating a first component, such as the load beam, and two for locating the second component, such as the flexure. The pins may be cylindrical or tapered. As head suspension designs get ever small and shorter in length, however, spatial constraints in accommodating all of the apertures needed for this type of tooling become more of an issue.

There are other deficiencies and shortcomings associated with prior art head suspensions and tooling. Conventional reference apertures such as those described above include manufacturing tolerances that affect the interface between the alignment tool and the head suspension component. The pins on the alignment tools also include manufacturing and positioning tolerances. These tolerances are cumulative so as to affect the alignment of individual head suspension components, and affect the forming of head suspension features, such as a load point dimple. In addition, when aligning individual head suspension components, the manufacturing tolerances in the apertures of the load beam and the flexure are "stacked" together because the head suspension components are engaged by common alignment pins, thus creating additional alignment problems. An additional shortcoming is that the alignment pins must typically be manufactured somewhat undersized so as to still be useable when the flexure and load beam apertures overlap each other to create a smaller through-hole for the pins to be inserted in due to manufacturing tolerances and misalignments in the head suspension components. Moreover, because the pins of the alignment tool are spaced apart a fixed distance, the pins may not be able to engage the reference apertures due to the manufacturing tolerances in the apertures.

One head suspension having aligning features that overcome some of the shortcomings of the described prior art, as well as a method and apparatus for forming such head suspension, is described in commonly owned U.S. Pat. No. 5,920,444 to Heeren et al., entitled FLEXURE AND LOAD POINT ALIGNMENT STRUCTURE IN A HEAD SUSPENSION. Another head suspension having aligning features that overcome some of the shortcomings of the described prior art is described in a commonly owned U.S. patent application Ser. No. 09/397,940 by Holaway et al., entitled HEAD SUSPENSION WITH COMPLIANT FEATURE FOR COMPONENT LOCATION. This head suspension has a component that includes a compliant feature adapted to engage a first pin and a datum engaging surface spaced from the compliant feature. The component is locatable relative to a datum by manipulation of the component with respect to the datum and a first pin to cause the first pin to engage and deflect the compliant feature when the datum engaging surface of the component is engaged and positioned with respect to the datum. The head suspension also includes a second component having a pin engaging feature and possibly a datum engaging surface alignable with the compliant feature and datum engaging surface of the first component, respectively. The compliant and non-compliant features are usable for locating head suspension components, such as load beams, flexures, and base plates, relative to each other or to tooling for head suspension fabrication purposes.

An ongoing need exists, however, for improved head suspension designs for use in dynamic storage devices wherein features are formed in the head suspensions that assist in the efficient and accurate alignment of the head suspension components. This need becomes more apparent as the size of head suspensions and components become increasingly smaller due to disk drive design changes in the industry. Such need is felt in the areas of part manufacturability, cost savings, tool construction, and other tool and alignment related areas.

SUMMARY OF THE INVENTION

A head suspension or head suspension for supporting a head slider over a rigid disk in a dynamic storage device and a method for manufacturing the same are disclosed. The head suspension includes a head suspension component and a compliant locating feature formed within the head suspension component. The compliant locating feature includes a plurality of spring beam tabs defined by an aperture and positioned to extend toward an opening. The compliant feature is preferably configured to receive a tapered cylindrical pin through the opening for precisely locating the head suspension component relative to a desired reference while the spring beam tabs are engaged by the tapered pin. The head suspension component may include two or more compliant locating features, and the head suspension may include two or more components that each include one or more compliant locating features.

The method of manufacturing includes the steps of providing a head suspension component, forming a compliant feature within the component, receiving a tapered cylindrical pin through the opening of the compliant feature, and locating the component precisely relative to a desired reference by positioning the component on the tapered pin at a predetermined location with the spring beam tabs engaging the tapered pin. When the head suspension includes two or more components, each including at least one compliant feature, the method includes receiving the tapered pin through the openings of compliant features on each component to locate the components relative to each other.

DETAILED DESCRIPTION OF THE INVENTION

Figure 1:
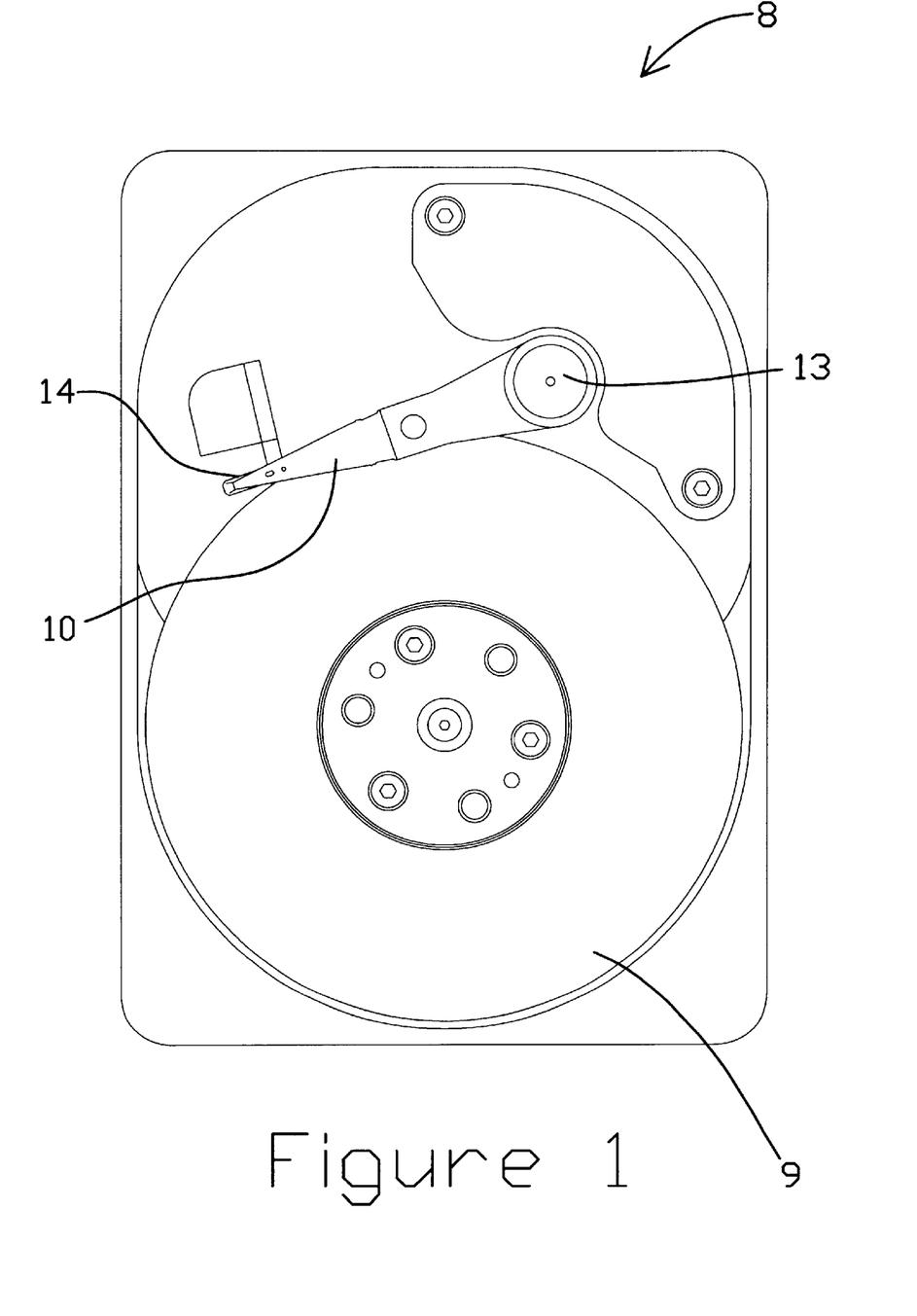
FIG. 1 is a top view of a disk drive, including a head suspension and disk.

With reference to the attached Figures, it is to be understood that like components are labeled with like numerals throughout the several Figures. FIG. 1 illustrates a rigid disk drive 8 that includes a head suspension 10 in which the present invention can be incorporated. Head suspension 10 resiliently supports a head slider 14 at a fly height above a rigid disk 9 during operation, as described above in the Background section. Head suspension 10 is connected to a rotary actuator 13, as is known, for accessing data tracks provided on the surface of rigid disk 9. Head suspension 10 could otherwise be utilized with a linear type actuator, as is also well known.

Figure 2:
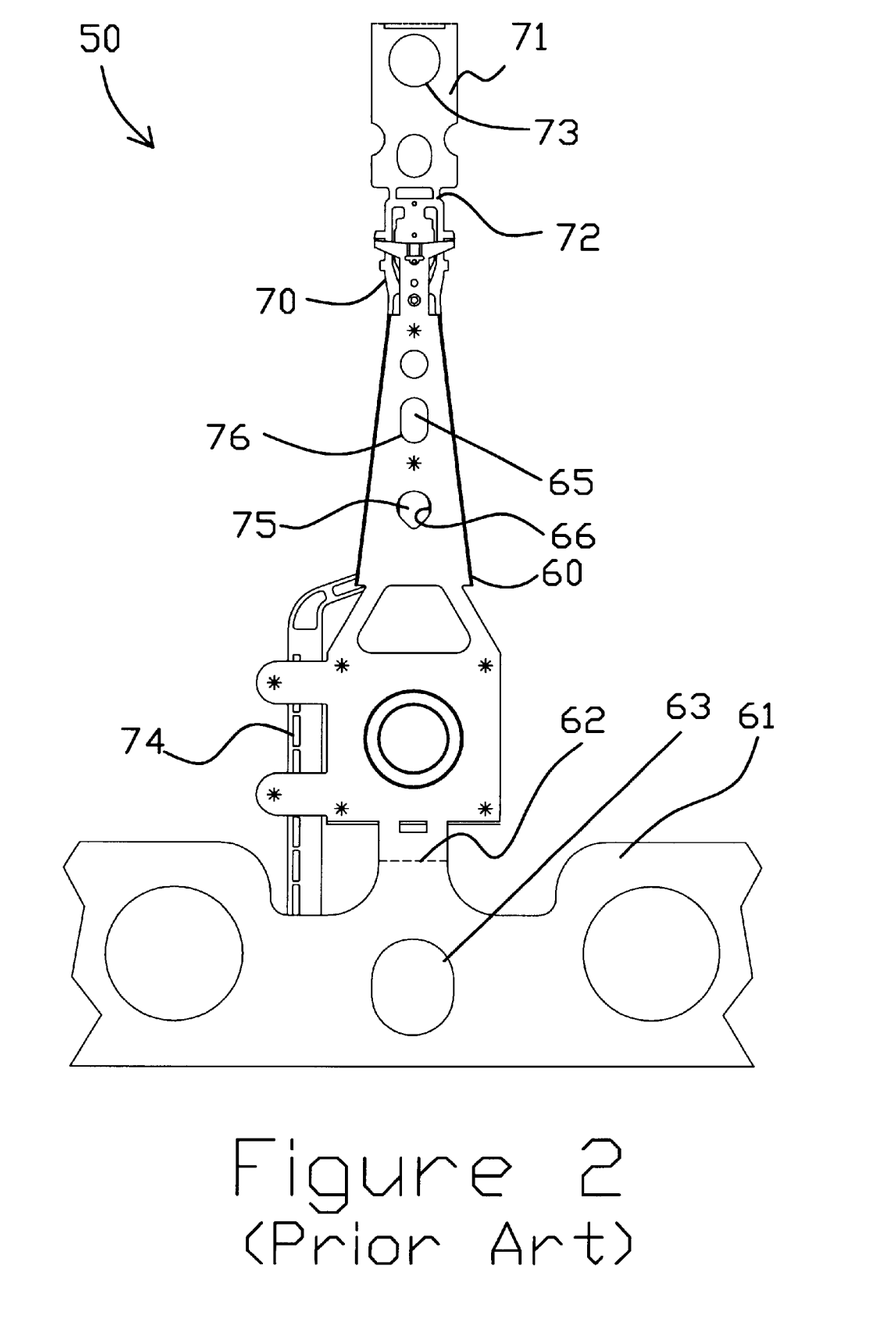
FIG. 2 is a top view of a prior art head suspension during fabrication including carrier portions for supporting the head suspension components.

Referring now to FIG. 2, a head suspension 50 of the prior art is shown assembled from a load beam 60 and a flexure 70. Load beam 60 is shown attached to a detachable load beam carrier portion or strip 61 and is separable at line 62. The carrier strip 61 includes an aperture 63 for use with a tooling alignment pin (not shown), as described above in the Background section. Load beam 60 also include an alignment aperture 65 to be used with a second pin (not shown). Flexure 70, including tail 74, is shown attached to a detachable flexure carrier portion or tab 71 and is separable at detachment line 72. The flexure carrier tab 71 includes an aperture 73 for use with a third tooling alignment pin (not shown). Flexure 70 includes an alignment aperture 75 to be used with a fourth pin (not shown).

By securing each component (load beam 60 and flexure 70) with two pins, the two components may be aligned with respect to the tool and each other for assembly, securement (such as welding) or other manufacturing processes. However, a four pin tool is required in order to achieve such alignment. In addition, extra openings 66, 76 in both the load beam 60 and flexure 70, corresponding to and aligning with apertures 75 and 65, respectively, are required in order to pass the respective pins through such apertures 75, 65. These extra openings 66, 76 are typically oversized so as not to affect the position of the other component on the pin. Other apertures may or may not be provided to meet other design requirements of the head suspension, in addition to those provided for alignment purposes.

Figure 3:
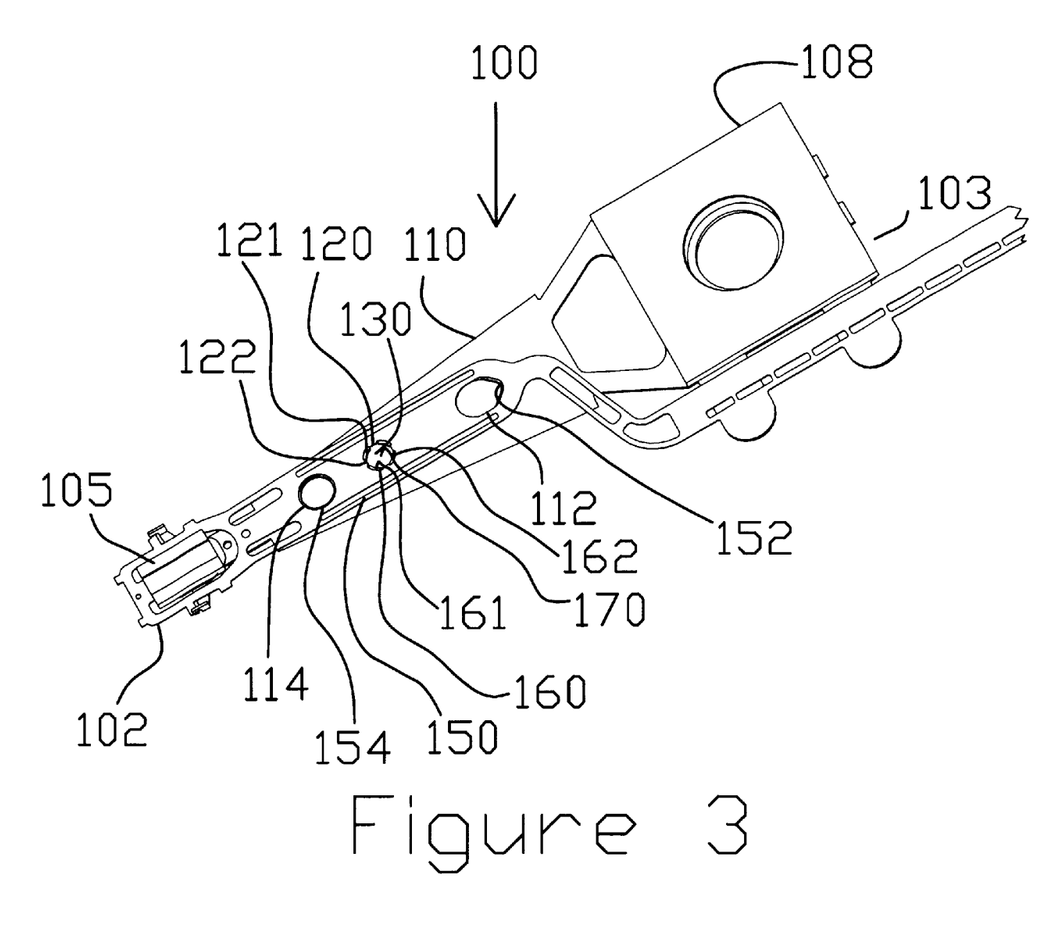
FIG. 3 is a perspective view of a head suspension with the flexure shown on top in accordance with the present invention, including a pair of compliant apertures.
Figure 4:
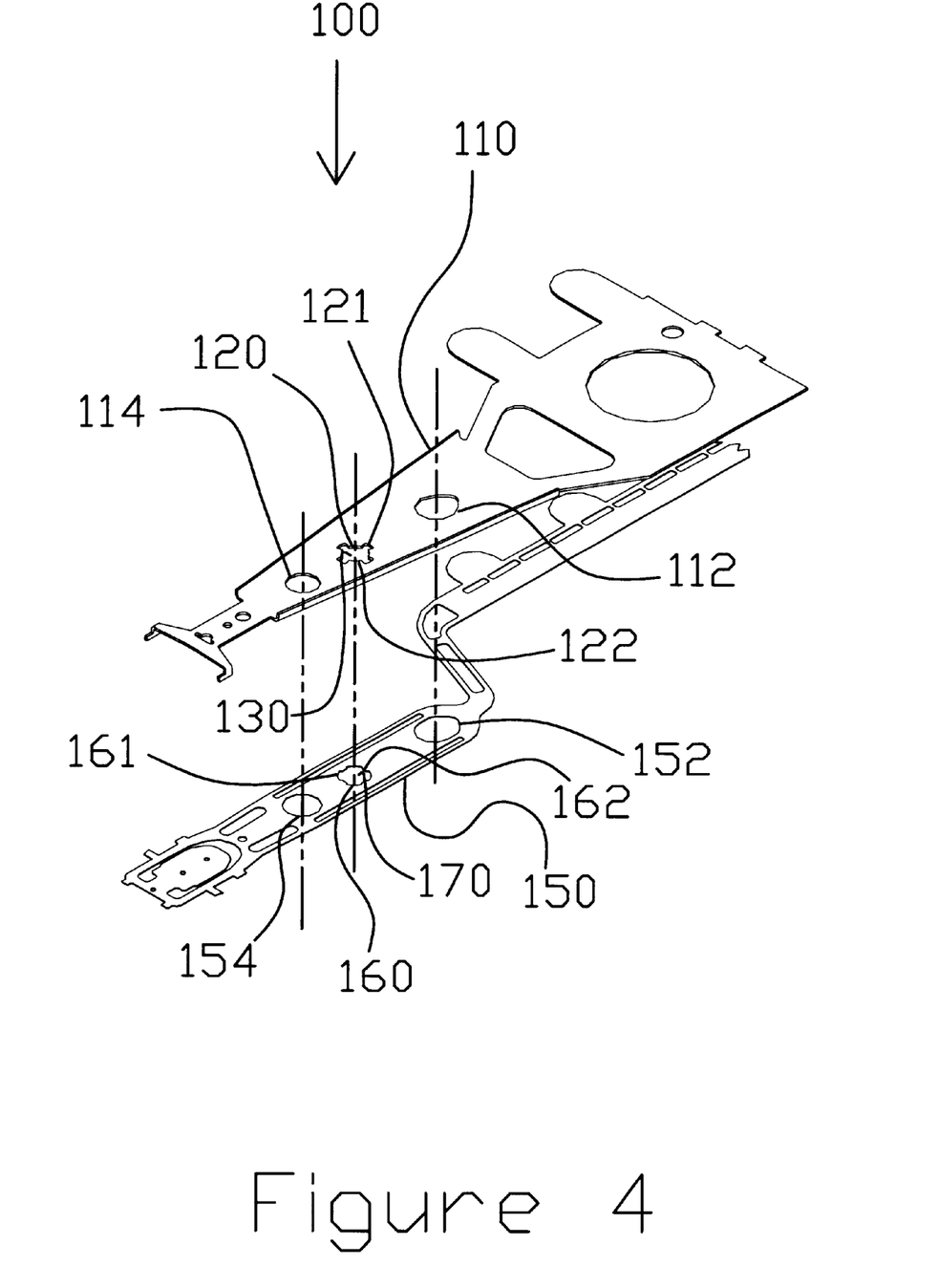
FIG. 4 is an exploded view of the head suspension in FIG. 3, shown with the load beam on top.
Figure 5:
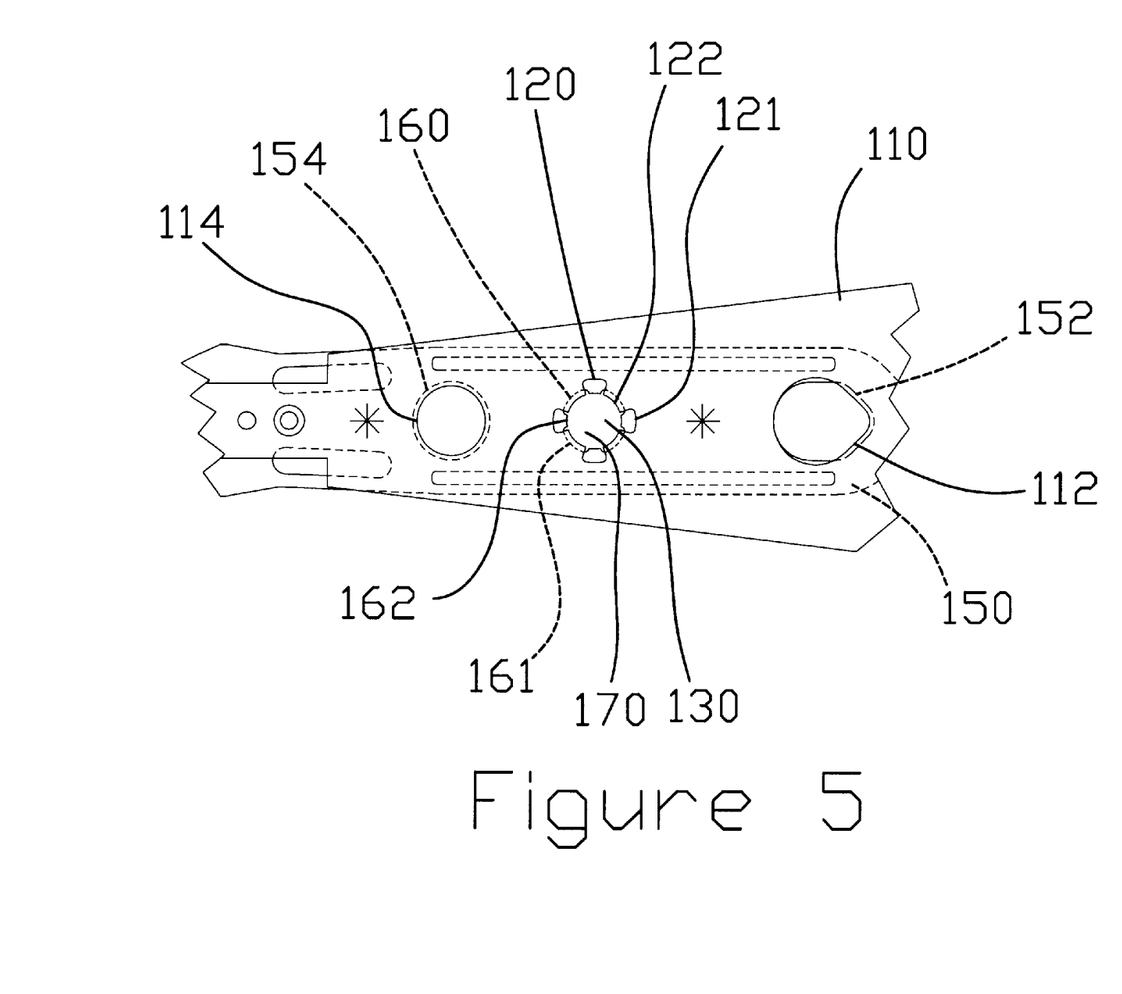
FIG. 5 is a detailed top view of the head suspension of FIG. 4.

Referring now to FIGS. 3–5, one embodiment of a head suspension 100 in accordance with the present invention is shown including a load beam 110 and a flexure 150. A head slider 105 is also shown mounted to the flexure 150 at a distal end 102 of the head suspension 100. A base plate 108 is shown mounted to the load beam 110 at the proximal end 103 of the head suspension 100. Load beam 110 includes a first locating feature 112 and a second locating feature 114. The flexure 150 includes first and second locating features 152, 154, respectively, that correspond in location with the first and second locating features 112, 114 of the load beam 110 so that when the two components 110, 150 are positioned with respect to each other, the first and second locating features of both components 110, 150 overlap. One of the first locating features 112, 152 and one of the second locating features 114, 154 are configured to locate its corresponding component 110 or 150 on a tooling pin. The other one of the locating features 112, 152 or 114, 154 is then configured to be oversized to allow for the passage of the tooling pin through both components 110, 150 without affecting the positioning of the components 110, 150.

The load beam 110 is also shown to include an embodiment of a load beam compliant aperture 120 in accordance with the present invention. Compliant aperture 120 is generally configured as a circular opening 130 having lobed cutouts 121 defining tabs or spring beams 122 extending toward or into the opening 130. The flexure 150 also includes an embodiment of a flexure compliant aperture 160, in accordance with the present invention, positioned to correspond to and align with load beam compliant aperture 120. Flexure compliant aperture 160 is also generally configured as a circular opening 170 having lobed cutouts 161 defining tabs or spring beams 162 extending toward the opening 170. The spring beams 162 of the flexure compliant aperture 160 are angularly offset with respect to the spring beams 122 of load beam compliant aperture 120. Although shown in FIGS. 4 and 5 with the load beam 110 mounted on top of the flexure 150 during assembly, securement or other processes, it is to be understood that the flexure 150 may instead be mounted on top of the load beam 110 (as shown in FIG. 3), if desired.

Figure 6:
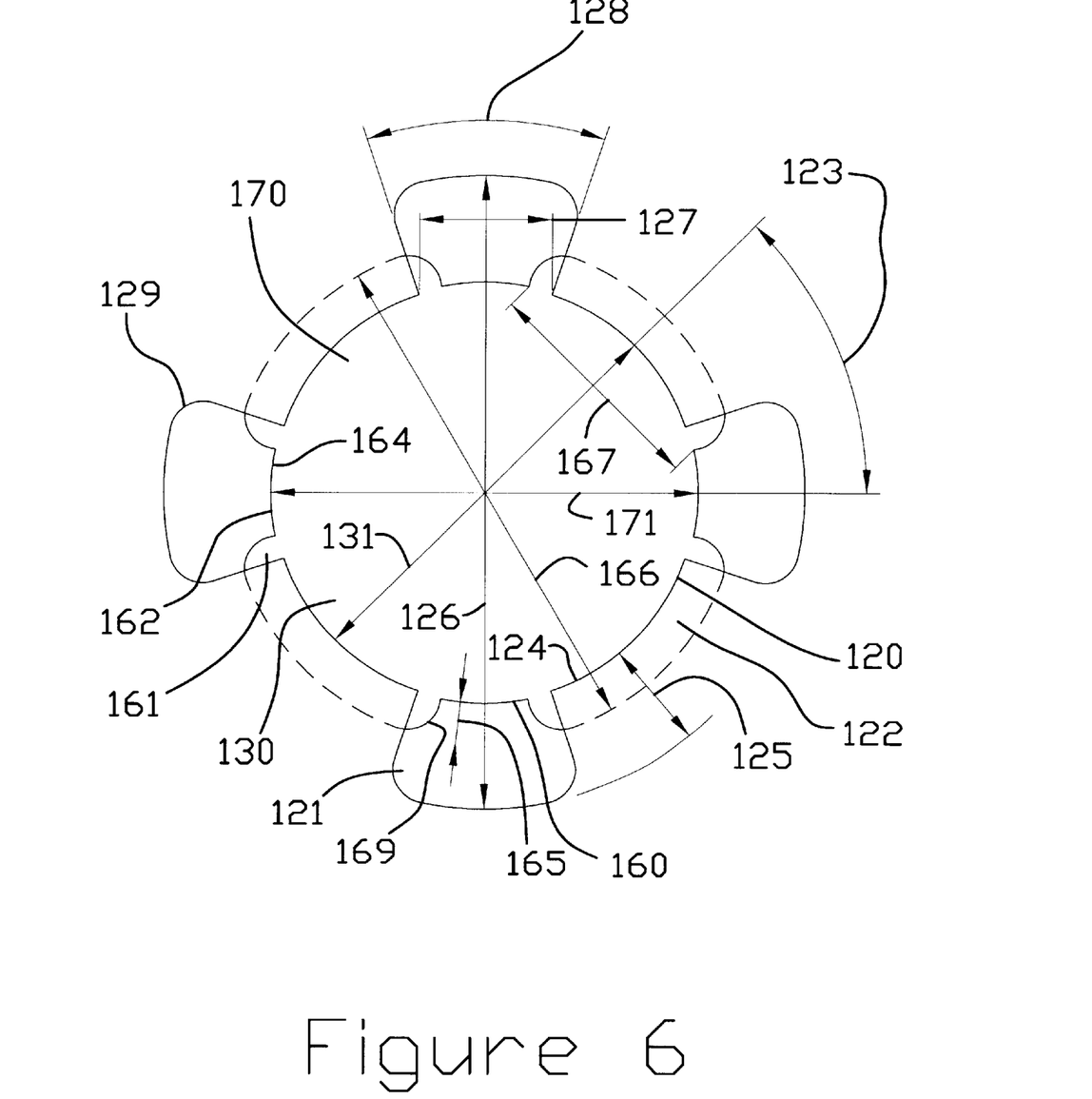
FIG. 6 is a detailed top view of the compliant aperture pair of FIGS. 5.

Referring now to FIG. 6, a detailed view of the two compliant apertures 120, 160 aligned with respect to each other is shown. In this embodiment, the load beam compliant aperture 120 is overlaid upon the flexure compliant aperture 160. Each aperture 120, 160 includes four lobed cutouts 121, 161, respectively, extending from the opening 130, 170 created by the aperture 120, 160, forming four spring beams 122, 162, respectively. As shown, load beam spring beams 122 are offset at an angle 123 of about 45 degrees from the flexure spring beams 162. It is to be understood, however, that more or less lobed cutouts defining more or less spring beams may be provided with other suitable offset angles, as needed to meet the compliance requirements of the components, or other design factors.

The lobed cutouts 121 of the load beam compliant aperture 120 are configured to be deeper than the lobed cutouts 161 of the flexure compliant aperture 160 resulting in longer spring beams 122 than spring beams 162. In one embodiment, the load beam opening 130 has an opening diameter 131 of about 0.643 millimeters with a spring beam length 125 of about 0.159 millimeters (or a lobe diameter 126 of about 0.96 millimeters). The lobed cutout 121 is configured generally as a circular ring sector having an opening dimension 127 of about 0.203 millimeters and a side wall angle 128 of about 40 degrees. The interior corners 129 of the lobed cutout 120 each have a corner radius of about 0.05 millimeters. As a result, spring beams 122 are generally trapezoidal, each with radiused outside corners 129 and an arcuate end 124 facing toward the opening 130.

The flexure opening 170 is configured with an opening diameter 171 of about 0.65 millimeters with a spring beam length 165 of about 0.055 millimeters (or a lobe diameter 166 of about 0.76 millimeters). The lobed cutout 161 is also generally configured as a circular ring sector having an opening dimension 167 of about 0.356 millimeters, and whose side walls encompass interior corners 169 each having a corner radius of about 0.05 millimeters. For the flexure compliant aperture 160, the spring beams 162 each have radiused sidewalls 169 and an arcuate end 164 facing toward the opening 170.

Although the load beam compliant aperture 120 and the flexure compliant aperture 160 are shown and described as each having specific configurations and dimensions, it is to be understood that other configurations and dimensions are also possible and are within the scope and spirit of the present invention. In particular, spring beam length may vary from about 0.01 millimeters on up, based on the requirements of the compliant feature design.

In this embodiment, the combination of first and second locating features 112, 152, 114, 154, and compliant apertures 120, 160 allow load beam 110 and flexure 150 to be located precisely with respect to each other for assembly and other processing. The overlapping compliant apertures 120, 160 are configured to receive a tapered cylindrical pin (not shown) through openings 130 and 170, respectively, which allows both the load beam 110 and flexure 150 to be located precisely on the pin and with respect to each other when the spring beams 122, 162 deflect upon engaging the pin. In addition, a first tooling pin (not shown) would be received through the first locating features 112, 152 and a second tooling pin (not shown) would be received through the second locating features 114, 154. The use of these three tooling pins locates the load beam 110 and flexure 150 precisely with respect to each other.

Figure 7:
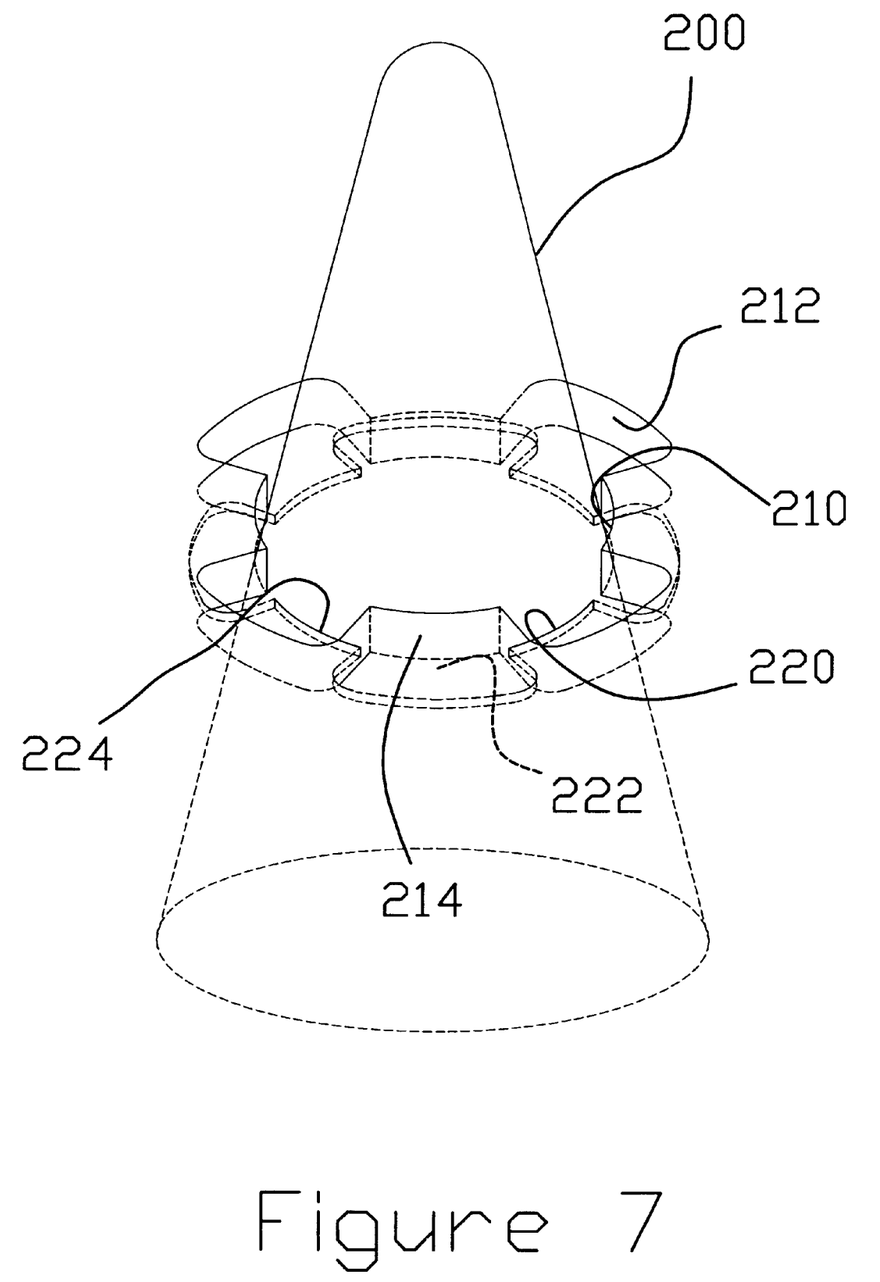
FIG. 7 is a perspective view of a second embodiment of a pair of compliant apertures positioned on a tapered tooling pin.

Referring now to FIG. 7, a tapered cylindrical pin 200 is shown positioned through a load beam compliant aperture 210 and a flexure compliant aperture 220. The load beam compliant aperture 210 is positioned above the flexure compliant aperture 220. The tapered pin 200, as shown in this embodiment, includes a 10 degree taper. However, it is to be understood that other tapers on similarly or differently configured pins are also usable and within the scope of the present invention, depending on the configuration of components and compliant apertures provided for use with the tapered pin.

In this embodiment, the load beam compliant aperture 210 and flexure compliant aperture 220 each have four, equally sized, lobed cutouts 212, 222 and spring beams 214, 224, respectively. As described in the embodiment above, there is an angular offset between the load beam compliant aperture 210 and flexure compliant aperture 220, such that the flexure spring beams 224 are located underneath the load beam lobed cutouts 212 and the load beam spring beams 214 are located above the flexure lobed cutouts 222. In this configuration, the flexure spring beams 224 are free to deflect upward as the flexure is placed over the tapered pin 200 without encountering load beam material or compromising the deflection of the load beam spring beams 214. In order to maintain the integrity of the load beam and flexure components, it is preferred that the deflection of the spring beams 214, 224 does not cause permanent or plastic deformation of the spring beams 214, 224.

Figure 8:
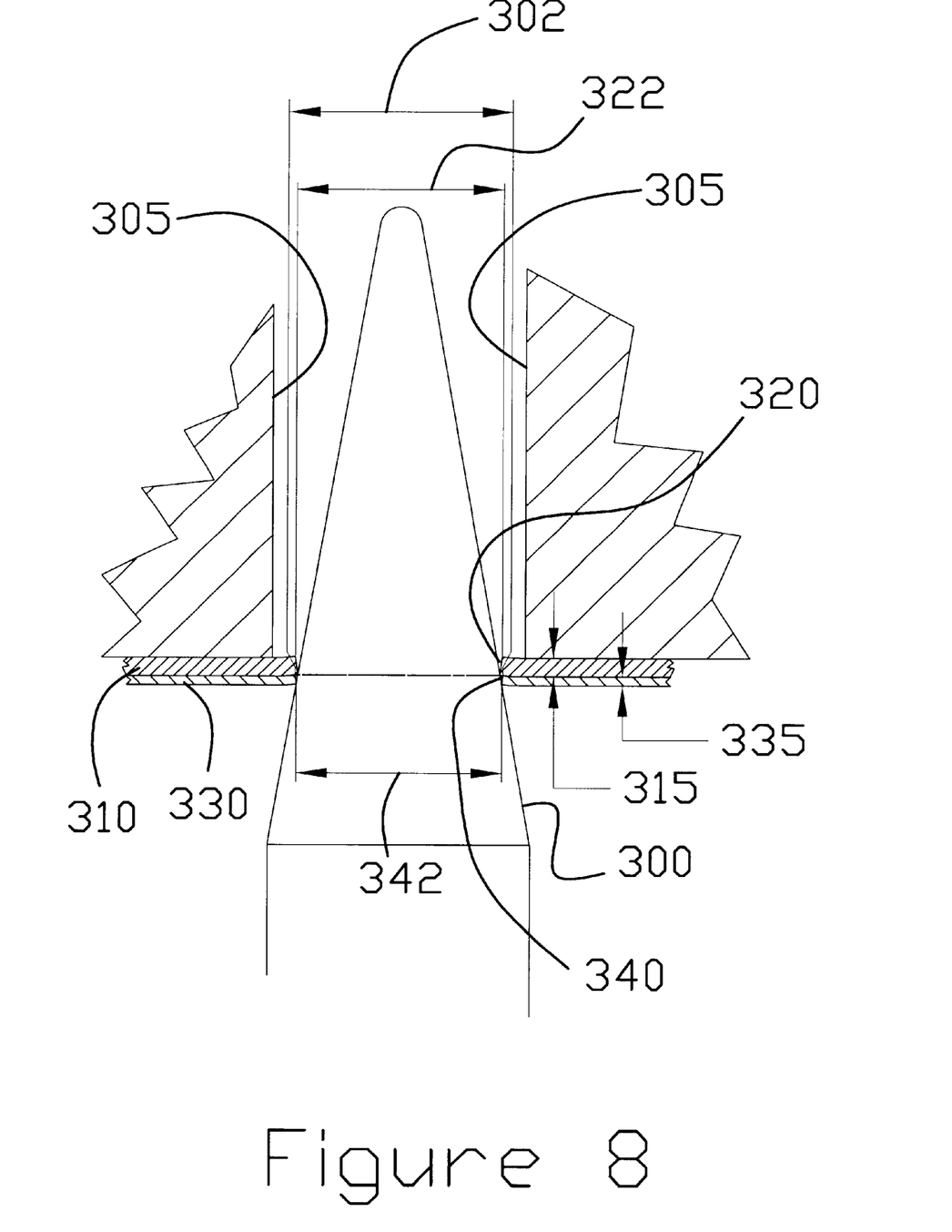
FIG. 8 is a cross-sectional view of a third embodiment of a pair of compliant apertures positioned on a tapered tooling pin.

Referring now also to FIG. 8, a cross-section of a tapered pin 300 is shown upon which a load beam 310 and a flexure 330 are positioned and held in place by clamps 305. The tapered pin 300 is passed through a load beam compliant aperture 320 and a flexure compliant aperture 340, each having a configuration similar to those shown and described in the embodiments above, including a plurality of spring beams extending toward an opening. In this embodiment, the flexure 330 is positioned underneath the load beam 310, such that the flexure 330 precedes the load beam 310 when the two are placed onto the tapered pin 300. As a result, the diameter 302 of the tapered pin 300 is slightly larger at the location of the flexure 330 than at the location of the load beam 310. In order to accommodate this difference in tapered pin diameter 302, the diameter 342 of the opening of the flexure compliant aperture 340 is slightly larger than the diameter 322 of the opening of the load beam compliant aperture 320. These diameters 322, 342 may be dimensioned based on the degree of taper of the tapered pin 300 and the desired location of the apertures 320, 340 upon the tapered pin 300.

In one embodiment, a tapered pin or pins, such as 300, are included in a tool that is raised into position with the tapered pins inserted through the openings of the compliant apertures, such as 320 and 340, on the component or components, such as 310 and 330, respectively, being located on the tapered pins. A clamp or clamps, such as 305, are positioned in a fixed location relative to the tapered pin tool. As this tool rises into position, the tapered pins pass through the openings in the compliant apertures until the diameter of the tapered pin(s), such as 302, becomes larger than the diameter of the openings, such as 322 and 342. At this point, the component(s) become pressed up against the clamp(s) and further upward movement of the tapered pin tool will result in deflection of the spring beams of the compliant apertures. The tapered pin tool stops its upward movement at a predetermined location, resulting in a relatively known amount of upward deflection at the spring beams. It is to be understood, however, that other methods of engaging the compliant apertures are also possible and are within the scope of the present invention.

The load beam 310 has a thickness 315 that is typically larger than a thickness 335 of the flexure 330. In one embodiment, the load beam thickness 315 is about 0.0025 millimeters and the flexure thickness is about 0.0008 millimeters. In order to ensure that unwanted deformation does not occur relative to the load beam and flexure compliant apertures 320, 340, the configuration, including but not limited to the size, shape, location and number, of the spring beams (not shown) and lobed cutouts (not shown) for the apertures 320, 340 are designed to accommodate at least the thicknesses 315, 335 of the components, the material of the components and the degree of taper of the tapered pin 300 based on the desired final location of the tapered pin 300. In addition, variations in opening diameter, 322 and 342, due to manufacturing tolerances and other factors will be readily accommodated by the tapered pin 300, thus ensuring location of the components 310 and 330 under varying circumstances.

As described above for the embodiment shown in FIGS. 3–5, a single set or pair of corresponding compliant apertures (one in the load beam and one in the flexure) may be provided, allowing for the elimination of a fourth tooling pin when locating the load beam and flexure relative to one another. In addition, compliant apertures may be provided in other locations on the head suspension components, including any removable carrier strips or carrier strip tabs provided for ease of handling during assembly and other fabrication processes. Provision of other components, such as a base plate, stiffener, or other head suspension component now known or later developed, may also be possible by the use of a compliant aperture in that other component. Such other components with compliant apertures may be located to correspond to the already provided compliant apertures and tapered pin, or they may be located by their compliant apertures with respect to the tapered pin or some other reference.

Optionally, a head suspension component may be located relative to another head suspension component by inclusion of a compliant location feature or aperture on one of the components and another type of aperture on the other one of the components. In any case, it is important that the spring beams of the compliant aperture are obstructed or impeded in deflecting upon engagement with a tapered pin. Alternatively, a head suspension component may be located relative to a datum, tool or item other than another head suspension component by a compliant locating feature formed within the component used in conjunction with a tapered pin.

Figure 9:
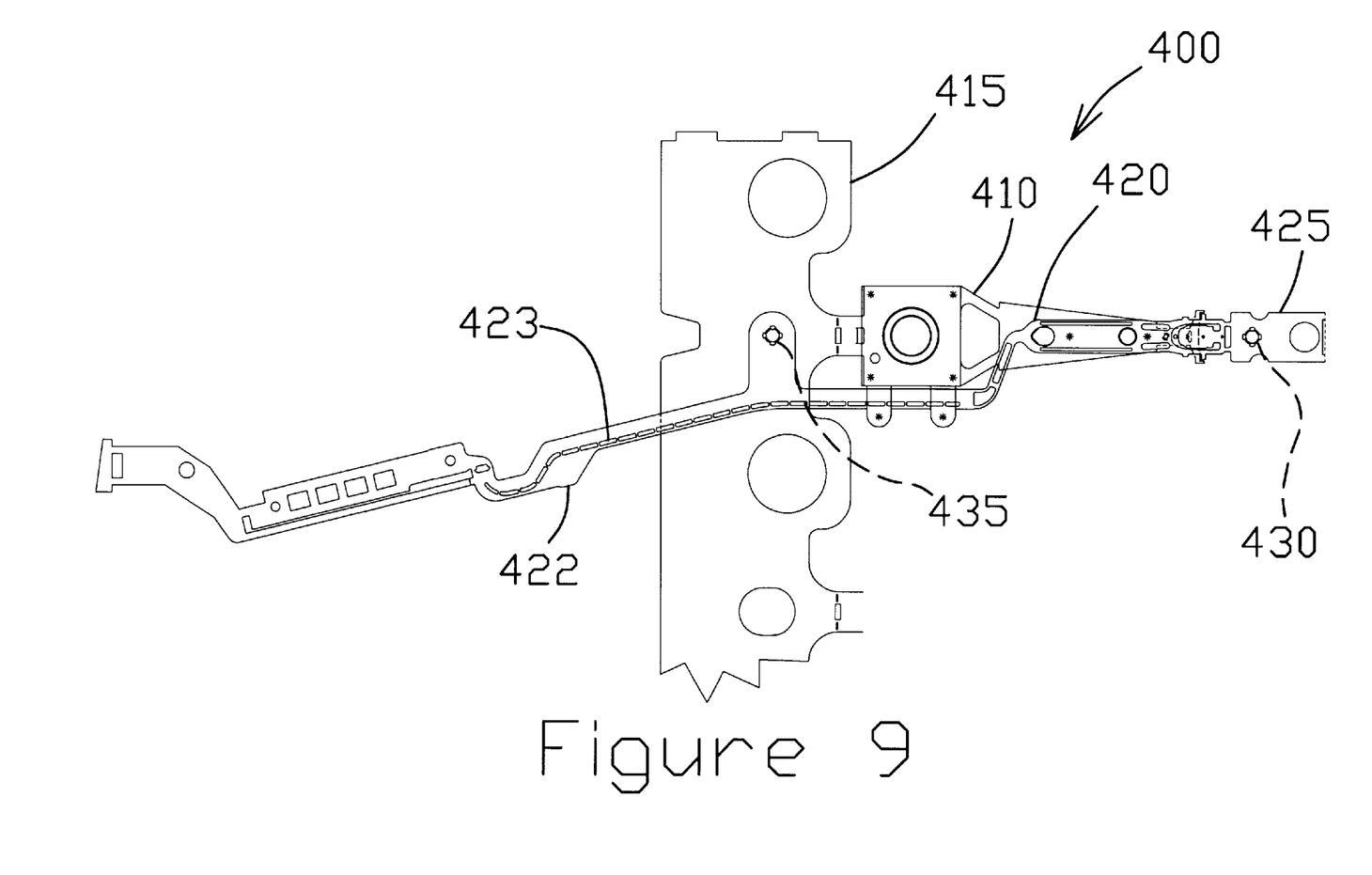
FIG. 9 is a top view of a fourth embodiment of a head suspension including a plurality of compliant aperture pairs.

Referring now to FIG. 9, another embodiment of a head suspension 400 is shown including a load beam 410 and a flexure 420. The load beam 410 is removably presented on carrier strip 415 and the flexure 420 is removably presented on a carrier strip tab 425. The flexure 420 includes an elongated tail 422 that typically includes electrically conductive traces 423 leading back to control electronics (not shown) for control of a head slider (not shown) that would be mounted on the flexure 420. In this embodiment, two compliant aperture pairs are provided for locating the various components with respect to each other. A first compliant aperture pair 430 is positioned on the flexure carrier strip tab 425 and locates the flexure 420 with respect to the load beam carrier strip 415. A second compliant aperture pair 435 is positioned on the load beam carrier strip 415 and locates the flexure tail 422 with respect to the load beam carrier strip 415.

Figure 10:
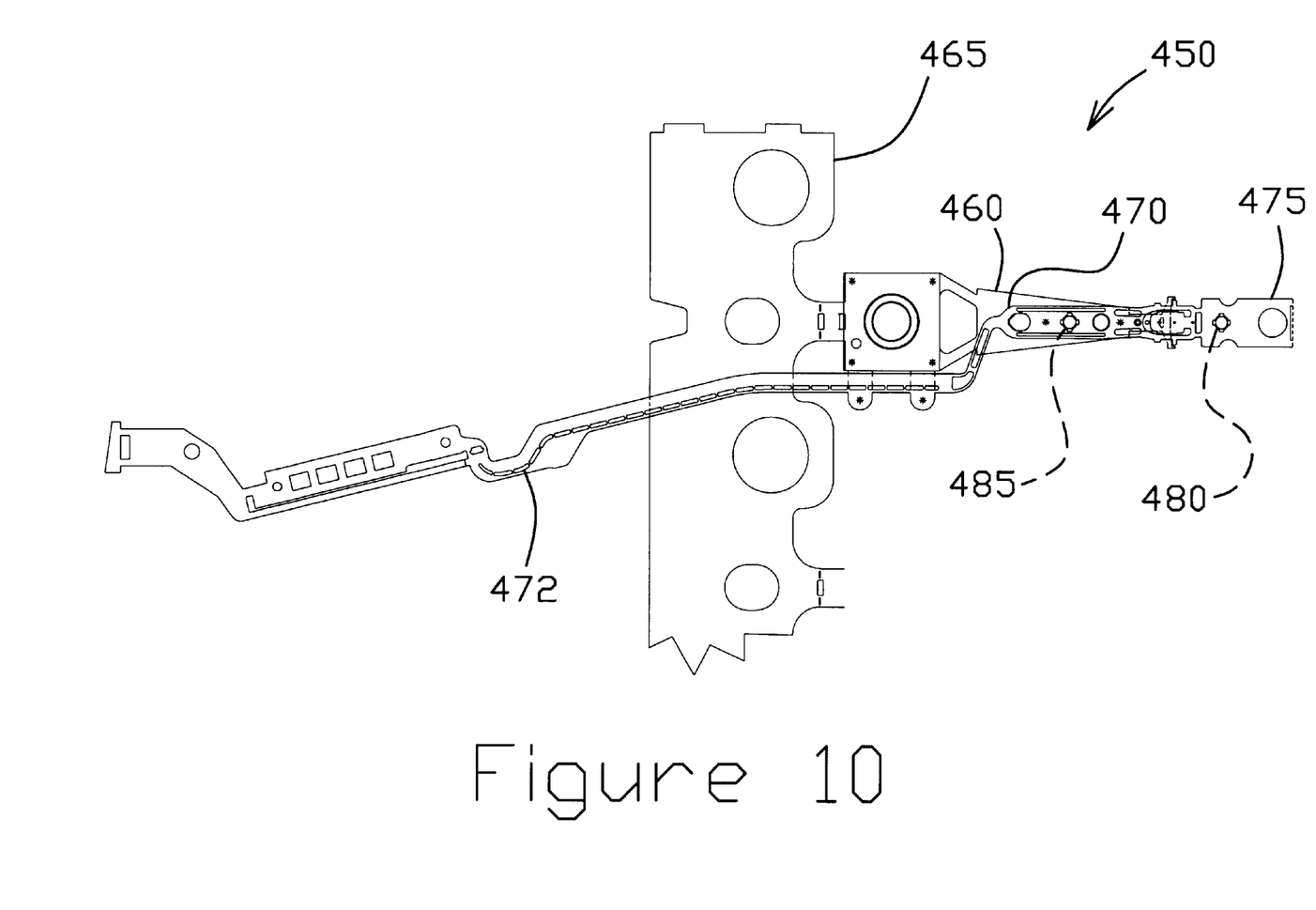
FIG. 10 is a top view of a fifth embodiment of a head suspension including a plurality of compliant aperture pairs.

Referring now to FIG. 10, yet another embodiment of a head suspension 450 is shown including a load beam 460 and a flexure 470. The load beam 460 is removably presented on carrier strip 465 and the flexure 470 is removably presented on a carrier strip tab 475. The flexure 470 also includes an elongated tail 472. In this embodiment, two compliant aperture pairs are provided for locating the various components with respect to each other. A first compliant aperture pair 480 is positioned on the flexure carrier strip tab 475 and locates the flexure 470 with respect to the load beam carrier strip 465, and can be the same or similar to the aperture pair 430 described above. In this embodiment, the second compliant aperture pair 485 is positioned on the load beam 460 and flexure 470 and locates these two components with respect to each other.

Although the embodiments shown include compliant apertures provided in one or two pairs for locating head suspension components with respect to each other, more than two compliant aperture pairs may be provided if desired and useful in locating components for fabrication processes. The position of the compliant aperture pairs may vary along the head suspension components as provided during fabrication as would be useful in locating components with respect to each other to meet the requirements of the intended processes. Optionally, as described above, one or more compliant apertures may be provided singly.

The flexibility of providing one or more compliant apertures, pairs or groupings for use in fabrication of head suspensions and components allows for the reduction in the number of locating or tooling pins, and thus the number of locating apertures, needed to locate the provided components with respect to each other. In addition to a reduction in pins and apertures, a corresponding reduction in the overall size of the components may be achieved, thereby providing head suspensions and components that meet current industry requirements for ever smaller components and suspensions. Further, higher flexibility may be achieved in compliant aperture placement in the head suspension due to less spatial constraints because of other locating pins and apertures. Within the head suspension itself, use of the compliant apertures allows for greater forgiveness in tolerance build-ups between components and between the tooling pins.

Other benefits that are achievable by use of the compliant apertures of the present invention include a reduction in the tooling costs due to a lower quantity of high precision holes and pins. Process improvements are also achievable, including a reduction in mean center variation from tool to tool and a reduction in process variation, both due to a reduction in the number of locating pins and the use of location schemes that have better mechanical control over the suspension components during use of the tool. In connection with these achievable benefits, no adverse affect on other head suspension characteristics, such as resonance, has been detected.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A head suspension for supporting a head slider over a disk in a dynamic storage device, the head suspension comprising:
   a head suspension component; and
   a compliant locating feature formed within the head suspension component, the compliant locating feature including a plurality of spring beam tabs defined by an aperture and positioned to extend toward an opening.

2. The head suspension of claim 1, wherein the head suspension component has been removed from a carrier portion.

3. The head suspension of claim 1, wherein the compliant locating feature is located on a carrier portion.

4. The head suspension of claim 1, wherein the compliant feature is configured to receive a tapered cylindrical pin through the opening for precisely locating the head suspension component relative to a desired reference while the spring beam tabs are engaged by the tapered pin.

5. The head suspension of claim 4, wherein the head suspension component comprises a first head suspension component, and wherein the head suspension further comprises a second head suspension component, with the compliant locating feature formed within one of the first and second head suspension components.

6. The head suspension of claim 5, wherein the compliant locating feature comprises a first compliant locating feature formed within the first head suspension component and a second compliant locating feature formed within the second head suspension component.

7. The head suspension of claim 6, wherein the plurality of spring beam tabs of the first and second compliant locating features are positioned so as not to obstruct deflection of the plurality of spring beam tabs of the other compliant locating feature when the spring beam tabs are engaged by the tapered pin.

8. The head suspension of claim 6, wherein the plurality of spring beam tabs of the first compliant locating feature are angularly offset from the plurality of spring beam tabs of the second compliant locating feature.

9. The head suspension of claim 6, wherein the plurality of spring beam tabs of the first compliant locating feature are positioned adjacent to but not overlapping the plurality of spring beam tabs of the second compliant locating feature.

10. The head suspension of claim 6, wherein the plurality of spring tabs of the first compliant locating feature are interposed between a plurality of first lobed spaces and the plurality of spring tabs of the second compliant locating feature are interposed between a plurality of second lobed spaces, and wherein the plurality of spring tabs of the first compliant locating feature are aligned with the plurality of second lobed spaces of the second compliant locating feature.

11. The head suspension of claim 6, wherein the plurality of spring beam tabs of the first compliant locating feature are of substantially equal size as the plurality of spring beam tabs of the second compliant locating feature.

12. The head suspension of claim 6, wherein the plurality of spring beam tabs of the first compliant locating feature are relatively larger than the plurality of spring beam tabs of the second compliant locating feature.

13. The head suspension of claim 12, wherein the plurality of spring beam tabs of the first compliant locating feature are radially longer and wider than the plurality of spring beam tabs of the second compliant locating feature.

14. The head suspension of claim 13, wherein the first head suspension component is a load beam and the second head suspension component is a flexure.

15. The head suspension of claim 14, wherein the first head suspension component is positioned over the second head suspension component when the first and second compliant locating features are engaged on the tapered pin.

16. The head suspension of claim 15, wherein the opening of the second compliant locating feature is larger in diameter than the opening of the first compliant locating feature.

17. The head suspension of claim 6, wherein the first head suspension component is positioned over the second head suspension component when the first and second compliant locating features are engaged on the tapered pin.

18. The head suspension of claim 5, wherein the first head suspension component is a load beam and the second head suspension component is a flexure.

19. The head suspension of claim 1, wherein the plurality of spring beam tabs are symmetrically positioned around the aperture.

20. The head suspension of claim 19, wherein the plurality of spring beam tabs comprises four spring beam tabs.

21. The head suspension of claim 4, wherein the plurality of spring beam tabs are configured to minimize plastic deformation of the plurality of spring beam tabs upon deflection during engagement by the tapered pin.

22. The head suspension of claim 4, wherein a diameter of the opening is sized to accommodate a diameter of the tapered pin when the component is at a predetermined position with respect to the tapered pin.

23. A head suspension component for use in supporting a head slider over a rigid disk in a dynamic storage device, the head suspension component comprising a compliant locating feature including a plurality of spring beam tabs defined by an aperture and positioned to extend toward an opening, with the compliant feature configured to receive a tapered cylindrical pin through the opening for precisely locating the head suspension component relative to the tapered pin while the spring beam tabs are engaged by the tapered pin.

24. The head suspension component of claim 23, wherein the plurality of spring beam tabs are symmetrically positioned around the aperture.

25. The head suspension component of claim 24, wherein the plurality of spring beam tabs comprises four spring beam tabs.

26. The head suspension component of claim 23, wherein the plurality of spring beam tabs are configured to minimize plastic deformation of the plurality of spring beam tabs upon deflection during engagement by the tapered pin.

27. The head suspension component of claim 23, wherein a diameter of the opening is sized to accommodate a diameter of the tapered pin when the component is at a predetermined position with respect to the tapered pin.

28. A head suspension assembly for supporting a head slider over a rigid disk in a dynamic storage device, the head suspension assembly comprising first and second head suspension components precisely located with respect to one another by positioning of a compliant locating feature formed within one of the first and second head suspension components on a tapered cylindrical pin, the compliant locating feature including a plurality of spring beams that are defined by an aperture in the respective head suspension component and positioned to extend toward an opening, the plurality of spring beams engaging the tapered pin when the tapered pin is received in the opening.

29. The head suspension assembly of claim 28, wherein the compliant locating feature comprises a first compliant locating feature formed within the first head suspension component and a second compliant locating feature formed within the second head suspension component.

30. The head suspension assembly of claim 29, wherein the plurality of spring beam tabs of the first and second compliant locating features are positioned so as not to obstruct deflection of the plurality of spring beam tabs of the other compliant locating feature when the plurality of spring beam tabs are engaged by the tapered pin.

31. The head suspension assembly of claim 30, wherein the plurality of spring beam tabs of the first compliant locating feature are angularly offset from the plurality of spring beam tabs of the second compliant locating feature.

32. The head suspension assembly of claim 30, wherein the plurality of spring beam tabs of the first compliant locating feature are positioned adjacent to but not overlapping the plurality of spring beam tabs of the second compliant locating feature.

33. The head suspension assembly of claim 29, wherein the plurality of spring beam tabs of the first compliant locating feature are of substantially equal size as the plurality of spring beam tabs of the second compliant locating feature.

34. The head suspension assembly of claim 29, wherein the plurality of spring beam tabs of the first compliant locating feature are relatively larger than the plurality of spring beam tabs of the second compliant locating feature.

35. The head suspension assembly of claim 29, wherein the first head suspension component is positioned over the second head suspension component when the first and second compliant locating features are engaged on the tapered pin.

36. The head suspension assembly of claim 28, wherein the first head suspension component is a load beam and the second head suspension component is a flexure.

37. The head suspension assembly of claim 28, wherein the plurality of spring beam tabs are symmetrically positioned around the aperture.

* * * * *

UNITED STATES PATENT AND TRADEMARK OFFICE
CERTIFICATE OF CORRECTION

PATENT NO.     : 6,657,821 B1
DATED          : December 2, 2003
INVENTOR(S)    : Richard R. Jenneke It is certified that error appears in the above-identified patent and that said Letters Patent is hereby corrected as shown below:

<u>Title page, Item [54] and Column 1, line 1,</u>
Title, delete "HAND" and insert therefor -- HEAD --

Signed and Sealed this

First Day of June, 2004

JON W. DUDAS
*Acting Director of the United States Patent and Trademark Office*